United States Patent [19]

Rasmusson

[11] Patent Number: 5,475,731
[45] Date of Patent: Dec. 12, 1995

[54] ECHO-CANCELING SYSTEM AND METHOD USING ECHO ESTIMATE TO MODIFY ERROR SIGNAL

[75] Inventor: Jim A. J. Rasmusson, Brösarp, Sweden

[73] Assignee: Ericsson Inc., Research Triangle Park, N.C.

[21] Appl. No.: 178,966

[22] Filed: Jan. 7, 1994

[51] Int. Cl.⁶ ............................. H04M 1/24; H04M 9/00; H04M 9/08
[52] U.S. Cl. ............................. 379/3; 379/406; 379/410; 379/411
[58] Field of Search ..................... 379/3, 58, 59, 379/406, 410, 411; 370/32.1

[56] References Cited

U.S. PATENT DOCUMENTS

| | | | |
|---|---|---|---|
| 4,468,641 | 8/1984 | Duttweiler | 379/410 |
| 4,584,441 | 4/1986 | Chance | 370/32.1 |
| 4,712,235 | 12/1987 | Jones, Jr. | 379/406 |
| 5,062,102 | 10/1991 | Taguchi | 379/406 |
| 5,084,865 | 1/1992 | Koike | 379/411 |
| 5,131,032 | 7/1992 | Esaki | 379/410 |
| 5,193,112 | 3/1993 | Sano | 379/410 |
| 5,237,562 | 8/1993 | Fujii | 370/406 |
| 5,263,019 | 11/1993 | Chu | 370/32.1 |

(List continued on next page.)

OTHER PUBLICATIONS

International Search Report, PCT/US95/00228, Apr. 13, 1995.
*Suppression of Acoustic Noise in Speech Using Spectral Subtraction*, S. F. Boll, IEEE Transactions on Acoustics, Speech, and Signal Processing, vol. ASSP-27, No. 2, Apr., 1979, pp. 113–120.
*High Quality Hands–Free Telephony Using Voice Switching Optimised With Echo Cancellation*, W. Armbruster, Signal Processing IV; Theories and Application; Elsevier Science Publishers B.V. (North–Holland) EURASIP, 1988, pp. 495–498.
*Acoustic Echo Cancellation for Full–Duplex Voice Transmission on Fading Channels*, S. Park et al., Proc. of International Mobile Satellite Conference, Ottawa, Ontario, Canada, Jun. 18–20, 1990.
*Acoustic Echo Cancellation for Loudspeaker Telephones*, W. Hsu et al., IEEE, GLOBCOM 1987, pp. 1955–1959.
*Full–Duplex Speakerphone with Acoustic and Electric Echo–Canceller Utilizing the DSP56200 Cascadable Adaptive FIR Filter Chip*, S. Park. Proc. of Midcon/90 Technical Conference on Electronic and Electrical Technology, Dallas, Tex., Sep. 11–13, 1990, pp. 1–5.
*Echo Cancellation and Applications*, K. Murano et al., IEEE Communications Magazine, Jan., 1990, pp. 49–55.
*Echo Cancellation in Mobile Radio Environments*, T. D. Burnett et al., IEE Colloquium on Digitized Speech Communication via Mobile Radio (Digest No. 139), pp. 7/1–4, 1988.
*Simulation of an Adaptive Echo Canceller for Carphone Hands–Free Units*, J. Noble, UK IT 88 Conference Publication, pp. 456–459, Swansea, UK, Jul. 4–7, 1988.
*Digital Processing of Speech Signals*, Rabinec et al., Prentice Hall, 1978, pp. 150–153.

*Primary Examiner*—Stephn Chin
*Assistant Examiner*—Vijay Shankar
*Attorney, Agent, or Firm*—Bell, Seltzer, Park & Gibson

[57] ABSTRACT

An echo-canceling system and method uses an echo estimate to modify the error signal which is obtained by the difference between an echo signal and the echo estimate. The modified error signal, rather than the error signal itself, is transmitted. By using the echo estimate as a parameter for modifying the error signal, improved hands-free performance may be obtained in a vehicular radiotelephone, such as a cellular telephone. Preferably, modification of the electrical error signal is performed by a center clipper which removes a portion of the electrical error signal which is below a variable threshold, wherein the variable threshold is determined by the echo estimate electrical signal. The variable threshold may be produced from the echo estimate electrical signal using an envelope detector.

28 Claims, 6 Drawing Sheets

U.S. PATENT DOCUMENTS

| | | | |
|---|---|---|---|
| 5,263,020 | 11/1993 | Yatsuzuka | 370/32.1 |
| 5,280,525 | 1/1994 | Wesel | 379/406 |
| 5,305,309 | 4/1994 | Chujo | 370/32.11 |
| 5,307,405 | 4/1994 | Sih | 370/32.1 |
| 5,315,585 | 5/1994 | Iizuka | 370/32.1 |
| 5,319,585 | 6/1994 | Amrany | 370/32.1 |
| 5,374,705 | 12/1993 | Younce et al. | 379/410 |

ECHO-CANCELING SYSTEM AND METHOD USING ECHO ESTIMATE TO MODIFY ERROR SIGNAL

FIELD OF THE INVENTION

This invention relates generally to methods and systems for reducing or canceling acoustic echoes, and more particularly to methods and systems for reducing or canceling acoustic echoes in a cellular radiotelephone configured for vehicular hands-free operation.

BACKGROUND OF THE INVENTION

Echo-canceling systems and methods are often required in communication systems in order to prevent users from receiving a copy of their own speech signal. It will be understood that although these systems and methods are referred to herein as "echo-canceling", they do not typically completely eliminate echo. Rather, they reduce echo from that which would be present without the echo-canceling system or method.

An echo can be disturbing if it is received by the user at a high level. The precise level at which the echo becomes disturbing is inversely related to the delay in the echo path. If the delay is short, a relatively high level of echo is actually desirable; hence the "sidetone" produced in a normal telephone handset. However, as the delay increases beyond 30–50 milliseconds, even minute echo signals can become very annoying to the user and disruptive to conversation.

In the public switched telephone network (PSTN), a principal source of echo is the impedance mismatch appearing at the hybrids used to interface two-wire and four-wire equipment. In the simplified PSTN telephone connection shown in FIG. 1, hybrid 120 directs signal energy arriving from telephone 100 via two-wire segment 110, to the two wire segment 180 of telephone 150 via PSTN 130, without allowing the signal to return to telephone 100. The impedance mismatch at hybrid 140 results in an echo signal 160 being returned to telephone 100. This is the source of so-called "talker echo." Echo 170 is similarly produced at telephone 150.

Figure 1:
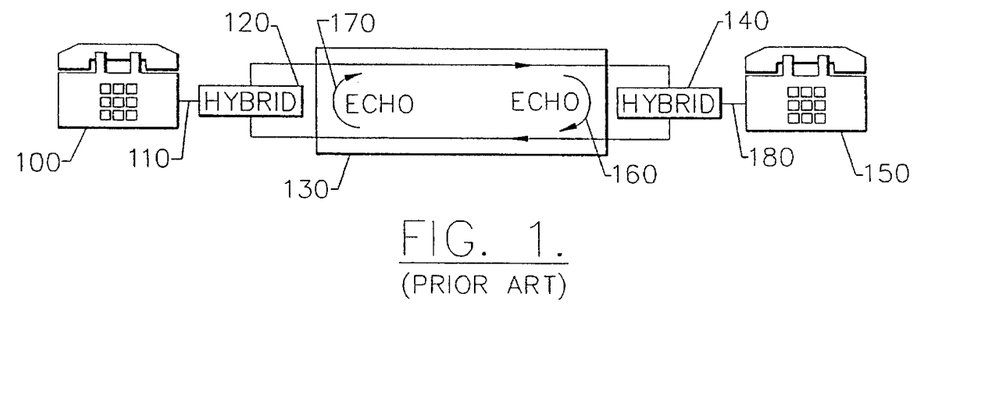
FIG. 1 is a simplified block diagram illustrating a conventional source of signal echoes in a PSTN.

The subjective effect of the talker echo depends upon the length of the transmission channel between the two hybrids 120 and 140. The human ear is well-adapted to receive short delays (for example 20–30 milliseconds). Therefore, echoes returning within this time period are not annoying even if the level of the echo is, for example, only 6 dB below the speaker's voice. If it is assumed that the effect is the same for both ends of the connection, each will experience a similar echo. For satellite communications where the delay can be as much as 540 milliseconds, even an echo 30–40 dB below the speaker's voice can be very annoying. Because of this, much effort has been directed towards cancellation of such echoes.

Figure 2:
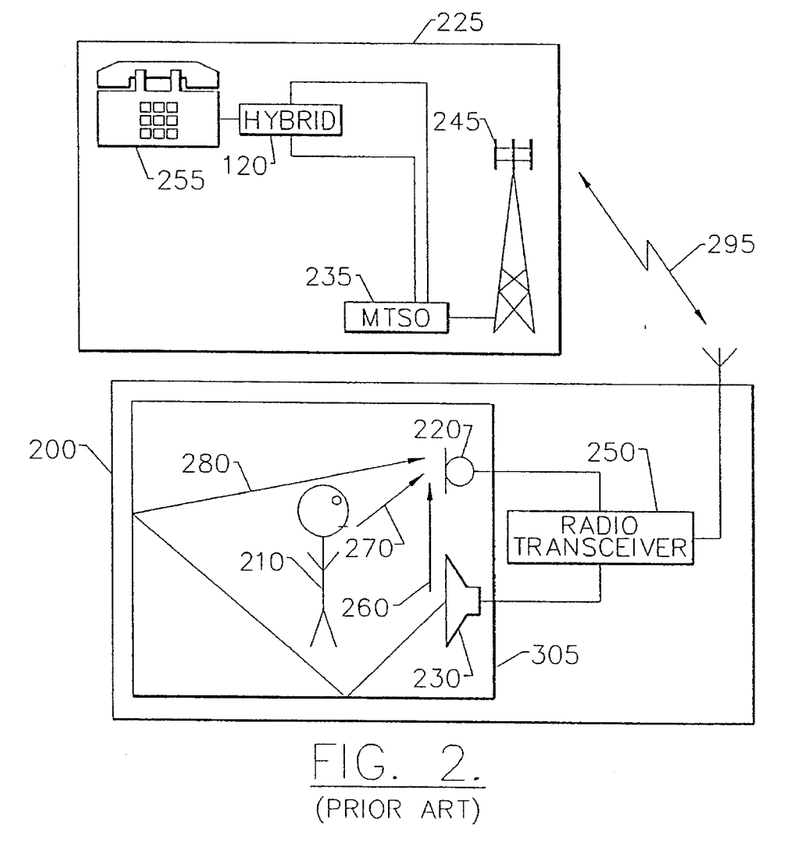
FIG. 2 is a simplified block diagram illustrating a conventional connection between a mobile telephone and a PSTN telephone.

Referring now to FIG. 2, for reasons of safety, users of vehicular (e.g. automotive) mobile radio telephones 250 often make use of the so-called "hands-free" configuration in vehicle 200. When in "hands-free" mode, the user 210 speaks into an external microphone 220 (shown by arrow 270) which is mounted in the vehicle interior 305, and listens to a remote loudspeaker 230 which is also mounted in the vehicle interior 305, thereby keeping the user's hands free to operate the vehicle. The microphone 220 is usually attached to the vehicle's sun visor or otherwise located in close proximity to the user's mouth, and the loudspeaker 230 is preferably located behind the microphone 220. If the microphone 220 has good directivity, this arrangement reduces the direct acoustic coupling 260 between microphone 220 and loudspeaker 230.

When, as illustrated in FIG. 2, a connection exists between a "hands-free" mobile radio and the PSTN 225, via radio link 295, base station 245 and mobile telephone switching office (MTSO) 235, there is an acoustic echo in addition to the signal echoes inherent in the PSTN. Because of the enclosed and confined nature of a vehicle interior 305, the microphone 220 not only receives the desired voice signal 270 but also receives acoustic signals from the loudspeaker 230. These acoustic echoes reach the microphone 220 at varying signal levels and delays depending upon the path traveled, such as path 280. It is not unusual to find that echoes which reach the microphone 220 with little more than 6 dB of attenuation or path loss.

Figure 3:
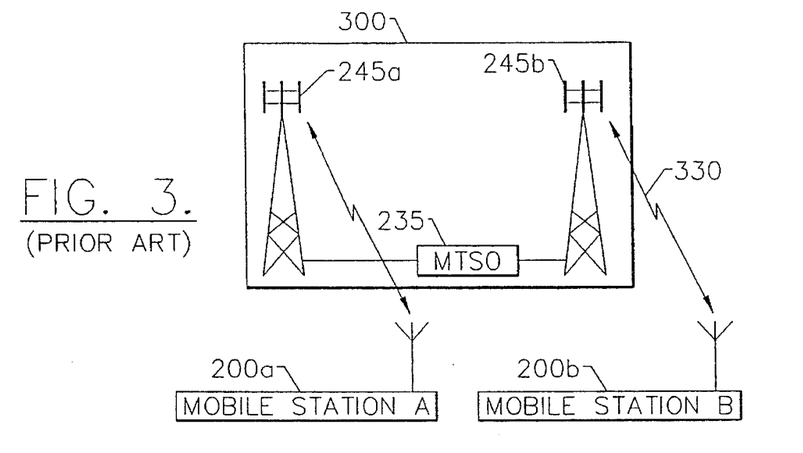
FIG. 3 is a simplified block diagram illustrating a conventional connection between two mobile telephones.

Still referring to FIG. 2, the acoustic echo generated by the hands-free equipment is most bothersome to a caller on telephone 255 in the PSTN 225. In a digital cellular system there is a brief processing delay which results from the finite time it takes to demodulate the digitized speech and to then reconstitute it into an analog voice signal. In normal conversation (without echoes) this delay is nearly imperceptible. However, if there is an acoustic echo, the caller on telephone 255 hears an echo of his own voice at a significant level and with a lengthy (150–200 millisecond) delay, thus making normal conversation very difficult. This is not limited to a PSTN connection, but will also exist if the connection occurs between two vehicles 200a, 200b using cellular system 300 as shown in FIG. 3. In fact, if both vehicles make use of a hands-free system, both users will experience an echo of their own voice.

Figure 4:
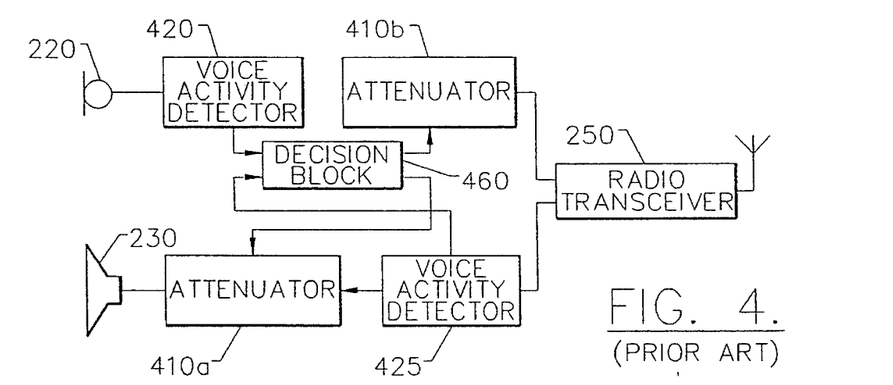
FIG. 4 is a block diagram illustrating a conventional voice-switched attenuator.

A conventional approach to canceling acoustic echoes is to use voice-switched attenuators as illustrated by the simplified schematic diagram of FIG. 4. Voice activity detectors (VAD) 420, 425 detect when speech signals are present at the VAD input. With regard to FIG. 4, input signals from the microphone 220 are coupled to one VAD 420, and signals intended for the loudspeaker 230 are coupled to another VAD 425. The output of each VAD 420, 425 is coupled to a decision block 460 whose function is to decide which, if any, of the two attenuators 410a, 410b should be applied. If a speech signal is present at the output of the microphone 220 and no speech signal is being directed to the loudspeaker 230, then the attenuator 410a, located between the radio transceiver 250 and the loudspeaker 230, is activated, thereby preventing any sound from coming out of the loudspeaker 230 while the microphone 220 is active. The result is essentially half-duplex communication.

Experience with current "hands-free" cellular telephones shows that severe difficulties arise when using voice-switched attenuators in a mobile environment. Voice activity detectors require a finite time to decide whether or not speech is present, hence they may lead to the clipping of the first few speech syllables. In addition, the ambient noise in a mobile environment makes it very difficult for most known voice activity detectors to operate reliably. Voice switched attenuators systems are described in a publication by Burnett et al. entitled *Echo Cancellation in Mobile Radio Environments*, IEE Colloquium on Digitized Speech Communication via Mobile Radio, (Digest No. 139) pp. 7/1–4, December 1988.

Figure 5:
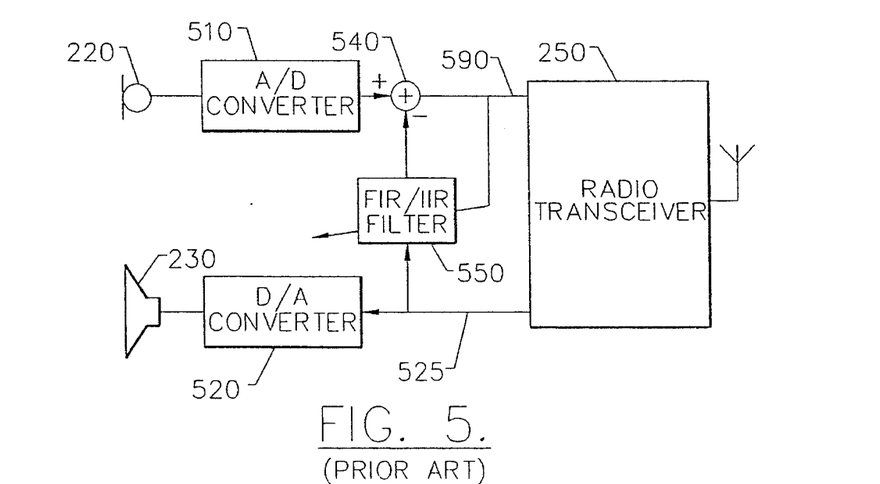
FIG. 5 is a block diagram illustrating a conventional echo canceler.

In digital radiotelephone systems, a conventional approach to eliminate signal echoes, such as which occur within the PSTN, is to use some form of echo canceler. An echo-canceler can also be used in analog systems. A conventional echo-canceler is shown in FIG. 5. A variable finite, or infinite, impulse response (FIR/IIR) filter 550 is used to construct a model of the echo path. A lattice filter can also be used. The filter parameters may be determined using an adaptive approach, or may be fixed, depending upon the echo environment. The echo canceler generates an echo replica by passing part of the acoustic signal 525 intended for the loudspeaker 230 through the filter 550. The signal replica is passed to a summing junction 540 where it is subtracted from the microphone's composite signal. If the replica is perfect, then only the desired voice signal remains in the output 590 and the echo is thereby removed.

Echo cancelers can be very effective in applications where the echo channel does not vary. If the echo channel is dynamic, it is difficult for the filter 550 to track the channel. It becomes even more difficult to track the echo channel if it contains nonlinear components. Echo cancelers are effectively used in high speed modems and facsimile machines since the echo channel in the PSTN is essentially linear and not very dynamic.

In a vehicle, however, the acoustic echo channel is both dynamic and nonlinear as a result of the loudspeaker, codecs, power amplifiers and other nonlinearities encountered in the acoustic path. Traditional echo cancelers suffer when confronted with nonlinearities in the echo path. Limited resolution in the A/D and D/A converters 510 and 520 respectively, coupled with a course sampling rate, can also degrade performance. Moreover, if the acoustic path is long, the number of taps in filter 550 begins to increase to a point where heavy demands are placed on the processing capacity of most commercially available digital signal processors.

Because of these limitations, acoustic echo cancelers typically provide only limited enhancement in a hands-free vehicular radiotelephone. In most practical cases, an echo return loss enhancement of only 10–20 dB is provided. This is inadequate for echoes with lengthy delays such as experienced in cellular systems. Echo cancellation in vehicle radiotelephone systems is described in the following publications: *Acoustic Echo Cancellation for Full-Duplex Voice Transmission of Fading Channels*, S. Park et al., Proc. of International Mobile Satellite Conference, Jun. 18–20, 1990; *Acoustic Echo Cancellation for Loudspeaker Telephones*, W. Hsu et al., IEEE, 1987, pp. 1955–1959; *Full-Duplex Speakerphone with Acoustic and Electric Echo-Canceler Utilizing the DSP56200 Cascadable Adaptive FIR Filter Chip*, S. Park, Proc. of Midcon/90 Technical Conference on Electronic and Electrical Technology, Sept. 11–13, 1990, pp. 1–5; *Echo Cancellation and Applications*, K. Murano et al., IEEE Communication Magazine, January 1990, pp. 49–55; and *Simulation of an Adaptive Echo Canceler for Carphone Hands-Free Units*, J. Noble, UK IT 88 Conference Proceedings, July, 1988, pp. 456–459.

In order to further cancel acoustic echoes in a vehicular radiotelephone system, an echo canceler has been combined with a shallow voice switch of the type described in FIG. 4. Shallow refers to the level of attenuation being 20–30 dB instead of the 40–50 dB normally used with voice switching systems. Such a combination is described, for example, in a publication by Armbruster entitled *High Quality Hands-Free Telephony Using Voice Switch Optimized with Echo Cancellation*, Signal Processing IV; Theories and Applications, Elsevier Science Publishers B.V., 1988, pp. 495–498. Although an improvement over existing techniques, this solution falls well short of emulating full-duplex communication.

SUMMARY OF THE INVENTION

It is therefore an object of the present invention to provide improved echo-canceling systems and methods.

It is another object of the present invention to provide echo-canceling systems and methods which are particularly suitable for hands-free vehicular radiotelephones.

These and other objects are provided, according to the present invention, by echo-canceling systems and methods which use an echo estimate to modify the error signal which is obtained by the difference between the echo signal and the echo estimate. The modified error signal, rather than the error signal itself, is transmitted over the radiotelephone network. By using the echo estimate as a parameter for modifying the error signal, improved hands-free performance is obtained, which can offer a level of performance which is nearly full duplex.

In particular, an echo-canceling system and method according to the invention converts a first acoustic signal into a first electrical signal. The first electrical signal will include two components. The first component is the voice signal which is spoken into a microphone. The second component is an acoustic echo which is picked up by the microphone. The echo-canceling system also includes second means for converting a second electrical signal which is received from the radiotelephone transceiver, into a second acoustic signal via a loudspeaker. An adaptive echo estimator is responsive to the second electrical signal for adaptively estimating an echo in the second electrical signal to produce an echo estimate electrical signal. A difference between the echo estimate signal and the first electrical signal is obtained to produce an electrical error signal. According to the invention, the electrical error signal is modified, based upon the echo estimate electrical signal, to produce a modified electrical error signal. The modified electrical error signal, rather than the electrical error signal, is transmitted to a remote receiving system via the mobile radiotelephone transceiver.

In a preferred embodiment of the present invention, modification of the electrical error signal is performed by a center clipper. The center clipper removes a portion of the electrical error signal which is below a variable threshold, wherein the variable threshold is determined by the echo estimate electrical signal. The variable threshold may be produced from the echo estimate electrical signal using an envelope detector. Thus, the echo estimate created by the echo canceler is used to create an envelope around the residual echo which is then removed by an adaptive center clipper. By using the echo estimate to adapt the center clipper parameters, distortion created by the center clipper is greatly reduced in both time and energy and the echo signal may be effectively removed.

BRIEF DESCRIPTION OF THE INVENTION

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
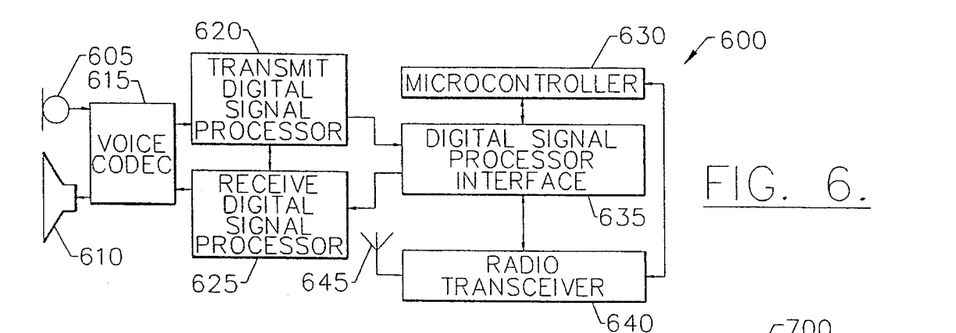
FIG. 6 is a block diagram of a radiotelephone wherein the present invention may be employed.

Referring now to FIG. 6, a functional block diagram of a cellular radiotelephone 600 wherein the present invention may be used, is shown. FIG. 6 is a simplified representation of an architecture for a dual-mode cellular radiotelephone which is described in greater detail in U.S. patent application Ser. No. 07/967,027 entitled *Multi-mode Signal Processing*, by Paul W. Bent and Björn Ekelund, filed on Oct. 27, 1992, and assigned to the part company of the present assignee, the disclosure of which is hereby incorporated herein by reference. Briefly, voice codec 615 obtains a first acoustic signal from microphone 605 and converts the signal into a first electrical signal. Voice codec 615 also obtains a second electrical signal and converts it into a second acoustic signal for transmission via loudspeaker 610. Voice codec 615 interfaces with a transmit digital signal processor (DSP) 620 and a receive digital signal processor 625. Transmit digital signal processor 620 processes a digitized voice signal from microphone 605 and provides the signal to digital signal processor interface 635 for transmission over antenna 645 via RF transceiver 640. Receive digital signal processor 625 processes a signal which is received from antenna 645 via RF transceiver 640 and digital signal processor interface 635, and produces an audio signal which can be applied to voice codec 615 for transmission over loudspeaker 610. Microcontroller 630 is used to control some or all of the components of the cellular radiotelephone 600.

The present invention is preferably embodied, in part, as a stored program executed within the transmit DSP 620 which may be, for example, a Texas Instruments C53 Digital Signal Processor. However, the present invention may also be embodied, in part, as a stored program executed in microcontroller 630 or in another processor. Alternatively, custom logic designs may be used. In an analog radiotelephone system, analog components may be used.

Figure 7:
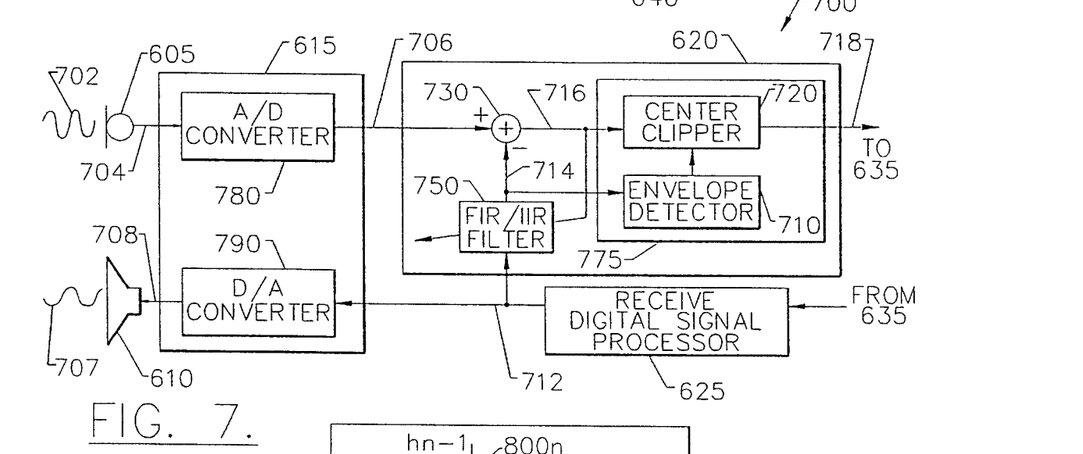
FIG. 7 is a block diagram of a preferred embodiment of an echo-canceling system and method of the present invention.

Referring now to FIG. 7, a block diagram of an echo-canceling system and method 700 according to the invention is shown. Microphone 605 converts a first acoustic signal 702 into a first electrical signal 704. Analog to digital (A/D) converter 780 converts the first electrical signal into a first digital electrical signal 706. It will be understood by those having skill in the art that the first digital electrical signal 706 includes two components. A first component is the voice signal which is produced by the user into microphone 605. A second component is the echo of the voice signal which is picked up by microphone 605.

Loudspeaker 610 produces a second acoustic signal 707 from a second electrical signal 708. Digital-to-analog (D/A) converter 790 produces the second electrical signal 708 from a second digital electrical signal 712 which is produced by receive digital signal processor 625. It will be understood that signal 712 includes two components. A first component is the received signal from a remote caller. A second component is an echo of the originating signal which was received by microphone 605.

First and second digital electrical signals 706 and 712 are preferably in the form of a pulse code modulated (PCM) bit stream. PCM is a well-known technique for digitizing speech having been employed, for example, for many years in wireline telephony. In PCM an analog signal is measured using an A/D converter at a particular instant in time and quantized, i.e., assigned a discrete value. This value is known as a sample. In the preferred embodiment the PCM bitrate is 8 kilosamples/second and each sample is 16 bits resulting in a serial bitrate of 128 kilobits/second.

It is assumed in FIG. 7 that the echo condition described previously is in effect. That is, a landline user is speaking and sound is emanating from the loudspeaker 610. In this situation, the D/A converter 790 is receiving a PCM bitstream, 712 which is the digitized loudspeaker signal. The D/A converter 790 converts the PCM bitstream 712 into an analog signal which is in turn applied to the loudspeaker 610. An audio amplifier (not shown) may be placed between the D/A converter 790 and the loudspeaker 610. As previously discussed, echo signals emanating from the loudspeaker 610 are received by the microphone 605. These echo signals are digitized and converted into a PCM bitstream (second digital electrical signal) 706 via the A/D converter 780.

If no further action is taken on the first digital electrical signal (echo signal) 706 it will be transmitted and received by the landline user after some delay via the techniques described in the above-referenced U.S. patent application Ser. No. 07/967,027. However, as will now be presented, a fast response residual echo canceler, preferably implemented as instructions in the transmit DSP 620, will substantially remove the residual echo signal.

Figure 8:
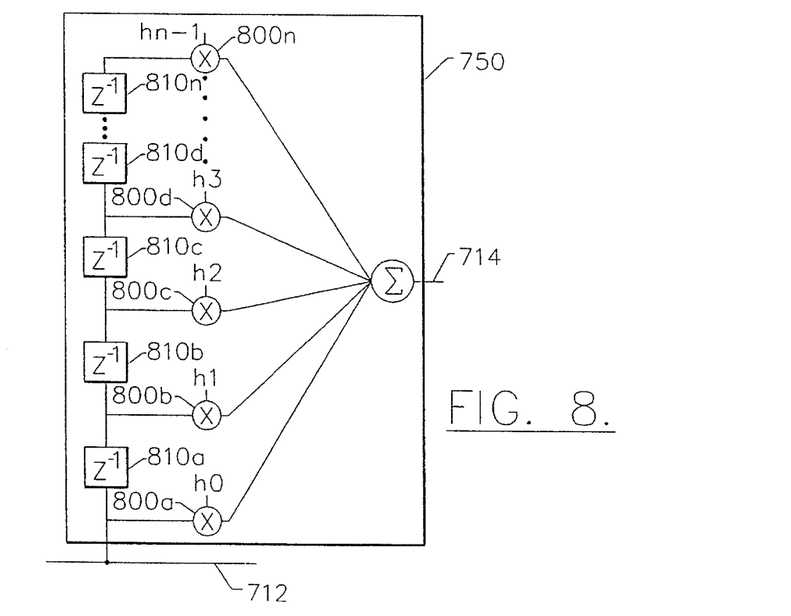
FIG. 8 is a block diagram of a tapped-delay filter which may be used for calculating an echo estimate in FIG. 7.

Still referring to FIG. 7, adaptive estimating means, such as an FIR/IIR filter 750 can be used to create a model of the echo path. In a preferred embodiment, the filter coefficients are determined using a conventional LMS (least mean squares) update. A block diagram of the LMS FIR filter is shown in FIG. 8. As illustrated, the preferred filter consists of a tapped delay line structure with n taps 800a . . . 800n and n delay registers 810a . . . 810n. As is known, the number of filter taps n is directly related to the length of the echo delay. In a preferred embodiment, n is chosen to be 128 to accommodate an acoustic echo delay of approximately 16 milliseconds. The impulse response estimate is represented by the filter tap coefficients. The echo estimate electrical signal 714 is determined as follows:

x=second digital electrical signal, 712

$\overline{X}(n)=[x(n),x(n-1),x(n-2) \ldots ,x(n-(N-1))]$ $\overline{h}(n)=[h0(n),h1(n),h2(n), \ldots ,hN-1(n)]$ ê(n)=echo estimate electrical signal, 714 and $\hat{e}(n) = \sum_{i=0}^{N-1} h_i x(n-i)$.

Figure 9:
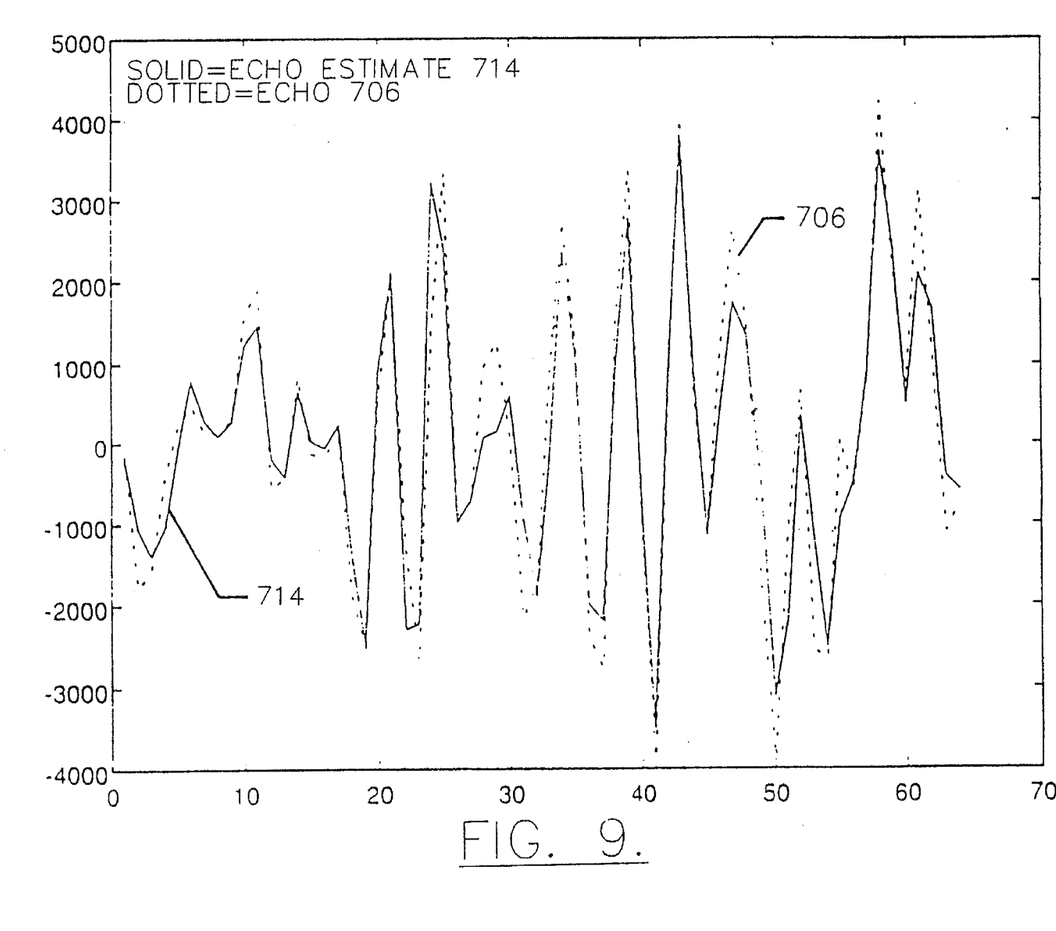
FIG. 9 graphically illustrates a relationship between an echo estimate and an actual echo signal.

In the extreme, the filter tap coefficients 800a ... 800n can be updated for every sample using the value of the echo estimate. If there are a large number of filter taps, this can be very demanding on the transmit digital signal processor 620, and may therefore be performed less often with some small sacrifice in performance. A typical example of a first electrical (echo) signal 706 and an echo estimate electrical signal 714 is shown in FIG. 9.

If the echo estimate electrical signal 714 is exact, then difference obtaining means such as summing junction 730 will result in perfect echo cancellation. In practical systems, the echo estimate is never perfect and some small residual echo, referred to as the electrical error signal 716, remains:

error(n)=echo(n)−ê(n)

If the user of the hands-free microphone 605 is speaking, then the error electrical signal 716 will include both the residual echo signal and the speech signal. It is assumed that the speech signal does not correlate well with the echo signal. The error can be maintained at a minimum value by updating the filter tap coefficients 800a ... 800n (FIG. 8) to minimize the energy in the error electrical signal 716. As already described, this can be accomplished by using a gradient step method such as LMS:

$\overline{h}(n+1)=\overline{h}(n)=\mu[\text{error}(n)]\overline{x}(n)$ where: µ=gradient step size It will be understood that the LMS technique is one of many techniques that can be used for this purpose. For example, a recursive least squares or normalized LMS filter may also be employed in the present invention. However, some additional processing may need to be performed to further reduce the echo when these other techniques are used.

Even with rapidly updated filter tap coefficients, in most echo cancelers the resultant error signal is only 10 to 25 dB beneath the uncancelled echo signal. This is still far short of the 45 dB of suppression necessary for delayed echo systems. According to the present invention, the echo estimate electrical signal 714 is used as a dependent variable for subsequent modification of the electrical error signal 716. Even if the echo return loss enhancement is only 10 to 25 dB, the echo estimate electrical signal 714 will be a fairly accurate parameter because it matches the real echo signal to a large extent. Accordingly, modifying means 775 is responsive to the electrical error signal 716 and to the echo estimate electrical signal 714, for modifying the electrical error signal 716 based upon the echo estimate electrical signal 714, to produce a modified electrical error signal 718. The modified electrical error signal 718, rather than the electrical error signal 716, is transmitted to the remote receiving system via DSP interface 635.

In a preferred embodiment of the invention, a fast adaptive center clipper 720, also known as a non-linear processor, is used to cancel the residual echo 716 from a conventional echo canceler using the echo estimate 714 as a dependent parameter. An envelope, or level, detector 710 is used to determine the parameters of the center clipper 720. In the preferred embodiment, the center clip is calculated as:

cc_level(n)=[abs(ê(n))]constant constant≈0.1–0.5

Figure 10:
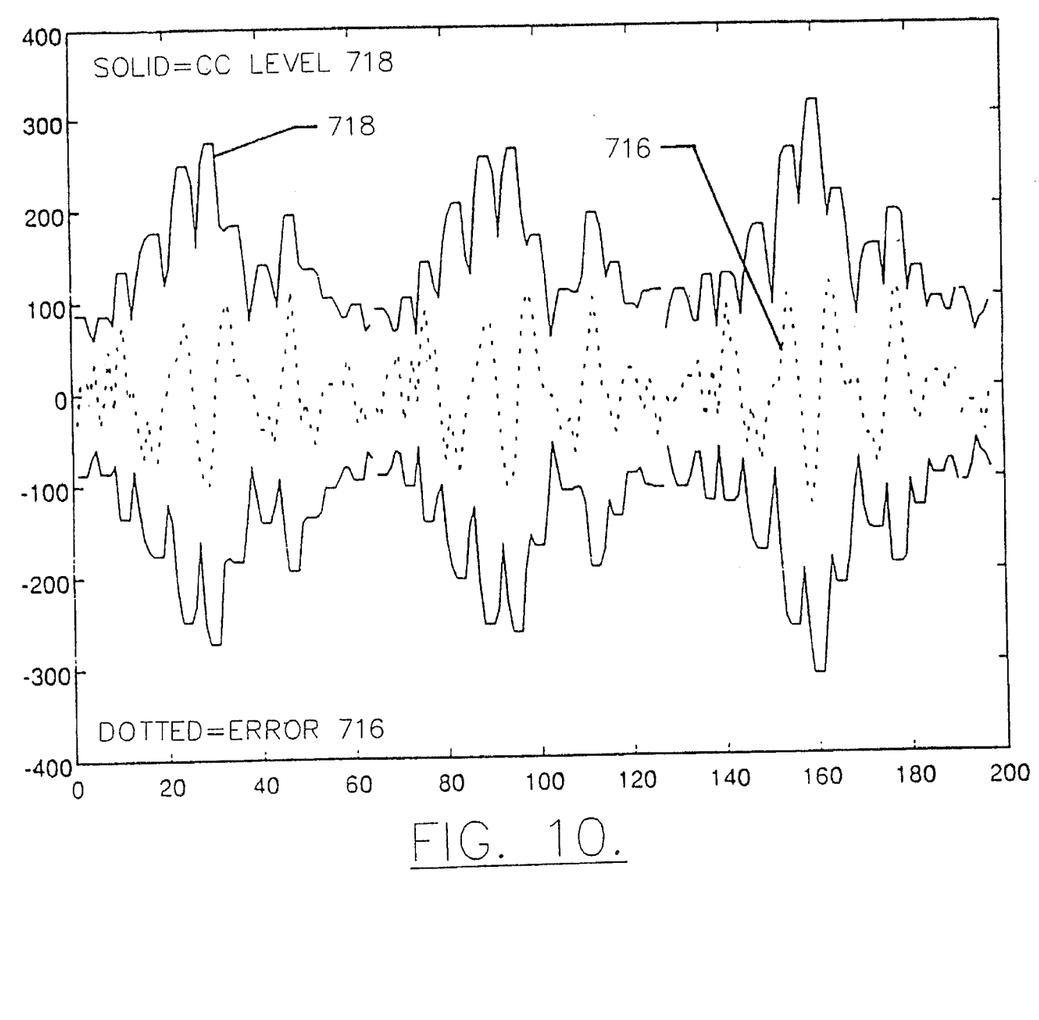
FIG. 10 graphically illustrates an error signal and a center clip level for the preferred embodiment of FIG. 7.
Figure 11:
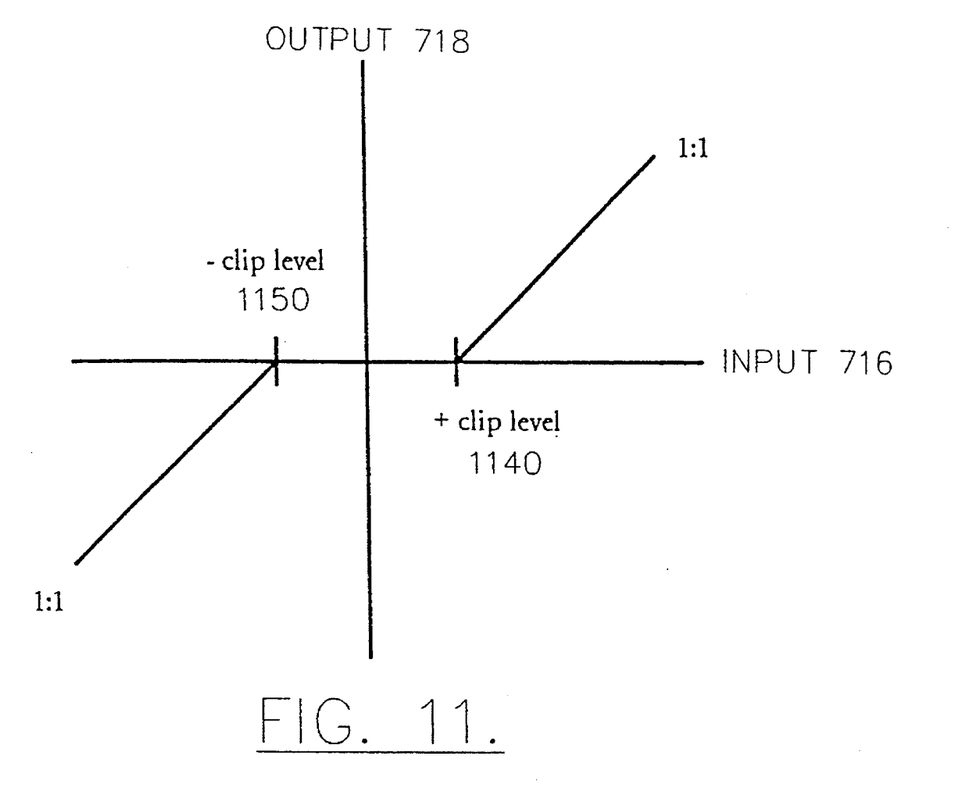
FIG. 11 graphically illustrates a transfer function of a center clipper of FIG. 7.

The center clipper has input/output characteristics shown in FIG. 11. The operation of center clipper 720 is described, for example, in a textbook by Rabinec et al. entitled *Digital Processing of Speech Signals*, Prentice Hall, 1978, pages 150–153. Electrical error signals 716 which fall beneath the clip signal levels 1140, 1150 are completely removed from modified electrical error signal 718, while electrical error signals 716 which exceed these levels are passed without amplification or attenuation. The echo estimate electrical signal 714 is used to adjust the clip levels 1140, 1150. Although in the preferred embodiment the clip level is adjusted by a constant value between 0.1 and 0.5, this value may be adaptively determined as well. The center clipper 720 therefore can be described by the following equation:

output(n)=sign (error))*(abs(error(n)−cc_level) for| error(n)|>cc_level output (n)=0 for|error(n)|≦cc_level FIG. 10 graphically illustrates an error electrical signal 716 (i.e., residual echo) and the resultant modified error electrical signal 718. By center clipping the error electrical signal 716 the residual echo can be reduced by more than 45 dB.

As will be appreciated by those skilled in the art, suppression techniques other than center clipping can also be successfully employed. For example, an adaptive attenuator, or spectral subtractor may be used in modifying means 775. Spectral subtraction is described in a publication by Boll entitled suppression of *Acoustic Noise in Speech Using Spectral Subtraction*, IEEE Transactions on Acoustics, Speech, and Signal Processing, Vol. ASSP-27, No. 2, April 1979, pp. 113–120.

If, as described above, there is an overlaid speech signal, then that signal remains relatively undistorted. Since the user in the vehicle normally speaks at a level which is comparable to the level of the loudspeaker 610, both reach the microphone 605 at approximately the same level. Use of an echo canceler removes most of the energy in the echo, leaving only a small, but not insignificant residual. By using the echo estimate 714 as a dependent parameter for modifying means such as a center clipper—the effect of the subsequent modification on the uncorrelated voice signal is minimized. Near double-talk (i.e., full-duplex) performance is thereby provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An echo-canceling system comprising:

first means for converting a first acoustic signal into a first electrical signal;

second means for converting a second electrical signal into a second acoustic signal;

means, responsive to said second electrical signal, for adaptively estimating an echo in said second electrical signal to produce an echo estimate electrical signal;

means for obtaining a difference between said echo estimate electrical signal and said first electrical signal to produce an electrical error signal;

means, responsive to said electrical error signal and to said echo estimate electrical signal, for modifying said electrical error signal based upon said echo estimate electrical signal to produce a modified electrical error signal; and means for transmitting said modified electrical error signal to a remote receiving system.

2. The echo-canceling system of claim 1 wherein said modifying means comprises center clipping means, for removing a portion of said electrical error signal which is below a variable threshold, wherein said variable threshold is determined by said echo estimate electrical signal.

3. The echo-canceling system of claim 2 wherein said modifying means further comprises envelope detecting means, responsive to said echo estimate electrical signal, and electrically connected to said center clipping means, for producing said variable threshold.

4. The echo-canceling system of claim 1 wherein said first converting means comprises a microphone.

5. The echo-canceling system of claim 4 wherein said first converting means further comprises means for mounting said microphone in a vehicle for hands-free operation by a vehicle occupant.

6. The echo-canceling system of claim 5 wherein said first converting means further comprises analog-to-digital converting means for converting said first acoustic signal into a first digital electrical signal.

7. The echo-canceling system of claim 1 wherein said second converting means comprises a loudspeaker.

8. The echo-canceling system of claim 7 wherein said second converting means further comprises means for mounting said loudspeaker in a vehicle for hands-free operation by a vehicle occupant.

9. The echo-canceling system of claim 8 wherein said second electrical signal is a second digital electrical signal, and wherein said second converting means further comprises digital-to-analog converting means for converting said second digital electrical signal into said second acoustic signal.

10. The echo-canceling system of claim 1 wherein said adaptive echo estimating means comprises a finite impulse response filter.

11. The echo-canceling system of claim 10 wherein said finite impulse response filter is a least mean square filter.

12. The echo-canceling system of claim 1 wherein said difference obtaining means comprises means for subtracting said echo estimate electrical signal from said first electrical signal to obtain said electrical error signal.

13. The echo-canceling system of claim 1 wherein said transmitting means comprises radiotelephone transmitting means.

14. A hands-free vehicular radiotelephone comprising:

a microphone, adapted for mounting in a vehicle for hands-free operation by a vehicle occupant, to convert a first acoustic signal into a first electrical signal;

a loudspeaker, adapted for mounting in a vehicle for hands-free operation by a vehicle occupant, to convert a second electrical signal into a second acoustic signal;

means, responsive to said second electrical signal, for adaptively estimating an echo in said second electrical signal to produce an echo estimate electrical signal;

means for obtaining a difference between said echo estimate electrical signal and said first electrical signal to produce an electrical error signal;

means responsive to said electrical error signal and to said echo estimate electrical signal, for modifying said electrical error signal based upon said echo estimate electrical signal to produce a modified electrical error signal; and radiotelephone transmitting means, for transmitting said modified electrical signal to a radiotelephone network.

15. The hands-free vehicular radiotelephone of claim 14 wherein said modifying means comprises center clipping means, for removing a portion of said error electrical signal which is below a variable threshold, wherein said variable threshold is determined by said echo estimate electrical signal.

16. The hands-free vehicular radiotelephone of claim 14 wherein said adaptive echo estimating means comprises a least mean square filter.

17. The hands-free vehicular radiotelephone system of claim 14:

wherein said echo estimate electrical signal is a digital echo estimate signal, wherein said electrical error signal is a digital error signal, wherein said modified electrical error signal is a digital modified error signal, wherein said radiotelephone transmitting means is a digital radiotelephone transmitting means;

wherein said radiotelephone system further comprises analog-to-digital converting means for converting said first electrical signal into a first digital signal, said difference obtaining means obtaining a difference between said digital echo estimate signal and said first digital signal; and wherein said radiotelephone system further comprises digital-to-analog converting means for converting a second digital signal into said second electrical signal.

18. The hands-free vehicular radiotelephone system of claim 14 wherein said difference obtaining means comprises means for subtracting said echo estimate electrical signal from said first electrical signal to obtain said electrical error signal.

19. The hands-free vehicular radiotelephone of claim 14 wherein said adaptive echo estimating means comprises a finite impulse response filter.

20. An echo-canceling method comprising the steps of:

converting a first acoustic signal into a first electrical signal;

converting a second electrical signal into a second acoustic signal;

adaptively estimating an echo in said second electrical signal to produce an echo estimate electrical signal;

obtaining a difference between said echo estimate electrical signal and said first electrical signal to produce an electrical error signal;

modifying said electrical error signal based upon said echo estimate electrical signal to produce a modified electrical error signal; and transmitting said modified electrical error signal to a remote receiving system.

21. The echo-canceling method of claim 20 wherein said modifying step comprises the step of removing a portion of said electrical error signal which is below a variable threshold, wherein said variable threshold is determined by said echo estimate electrical signal.

22. The echo-canceling method of claim 21 wherein said removing step is preceded by the step of detecting the envelope of said echo estimate electrical signal, wherein said variable threshold is determined by the detected envelope of said echo estimate electrical signal.

23. The echo-canceling method of claim 20 wherein said difference obtaining step comprises the step of subtracting said echo estimate electrical signal from said first electrical signal to obtain said electrical error signal.

24. The echo-canceling method of claim 20 wherein said transmitting step comprises the step of transmitting said modified electrical error signal via radiotelephone.

25. An echo-canceling method for a hands-free vehicular radiotelephone, said hands-free vehicular radiotelephone including a microphone, adapted for mounting in a vehicle for hands-free operation by a vehicle occupant to convert a first acoustic signal into a first electrical signal, and a loudspeaker, adapted for mounting in a vehicle for hands-free operation by a vehicle occupant to convert a second electrical signal into a second acoustic signal, said echo-canceling method comprising the steps of:

adaptively estimating an echo in said second electrical signal to produce an echo estimate electrical signal;

obtaining a difference between said echo estimate electrical signal and said first electrical signal to produce an electrical error signal;

modifying said electrical error signal based upon said echo estimate electrical signal to produce a modified electrical error signal; and transmitting said modified electrical signal to a radiotelephone network.

26. The echo-canceling method of claim 25 wherein said modifying step comprises the step of removing a portion of said electrical error signal which is below a variable threshold, wherein said variable threshold is determined by said echo estimate electrical signal.

27. The echo-canceling method of claim 25 wherein said removing step is preceded by the step of detecting the envelope of said echo estimate electrical signal, wherein said variable threshold is determined by the detected envelope of said echo estimate electrical signal.

28. The echo-canceling method of claim 25 wherein said difference obtaining step comprises the step of subtracting said echo estimate electrical signal from said first electrical signal to obtain said electrical error signal.

* * * * *